United States Patent [19]

Jones, III

[11] 4,025,832
[45] May 24, 1977

[54] ELECTRONIC SLIP DETECTOR CIRCUIT
[75] Inventor: Emory E. Jones, III, Bluefield, W. Va.
[73] Assignee: Pyott-Boone, Inc., Tazewell, Va.
[22] Filed: Nov. 6, 1975
[21] Appl. No.: 629,520
[52] U.S. Cl. .............................. 318/317; 318/318; 318/316; 318/463
[51] Int. Cl.² ..................................... H02P 5/16
[58] Field of Search ........... 318/317, 318, 463, 316

[56] References Cited
UNITED STATES PATENTS

| 3,845,375 | 10/1974 | Stiebel | 318/463 |
| 3,885,206 | 5/1975 | Hort | 318/318 X |
| 3,946,295 | 3/1976 | Moore | 318/317 |
| R28,567 | 10/1975 | Matthey | 318/318 |

Primary Examiner—B. Dobeck
Attorney, Agent, or Firm—Bacon & Thomas

[57] ABSTRACT

Apparatus for detecting excessive slippage of a conveyor belt, as used, for example, in the coal mining industry includes electronic switching devices. A ring having a plurality of magnets thereon is mounted on a belt roller, and a detecting coil produces voltage pulses in response to the passage of the magnets. The voltage pulses are amplified, squared, and replaced by fixed width pulses at a frequency proportional to belt speed. The fixed width pulses are integrated to provide an average voltage having a value proportional to the conveyor belt speed. The average voltage is compared with an adjustable reference, and is used to turn off the belt driving motor when belt speed drops below a predetermined threshold.

12 Claims, 4 Drawing Figures

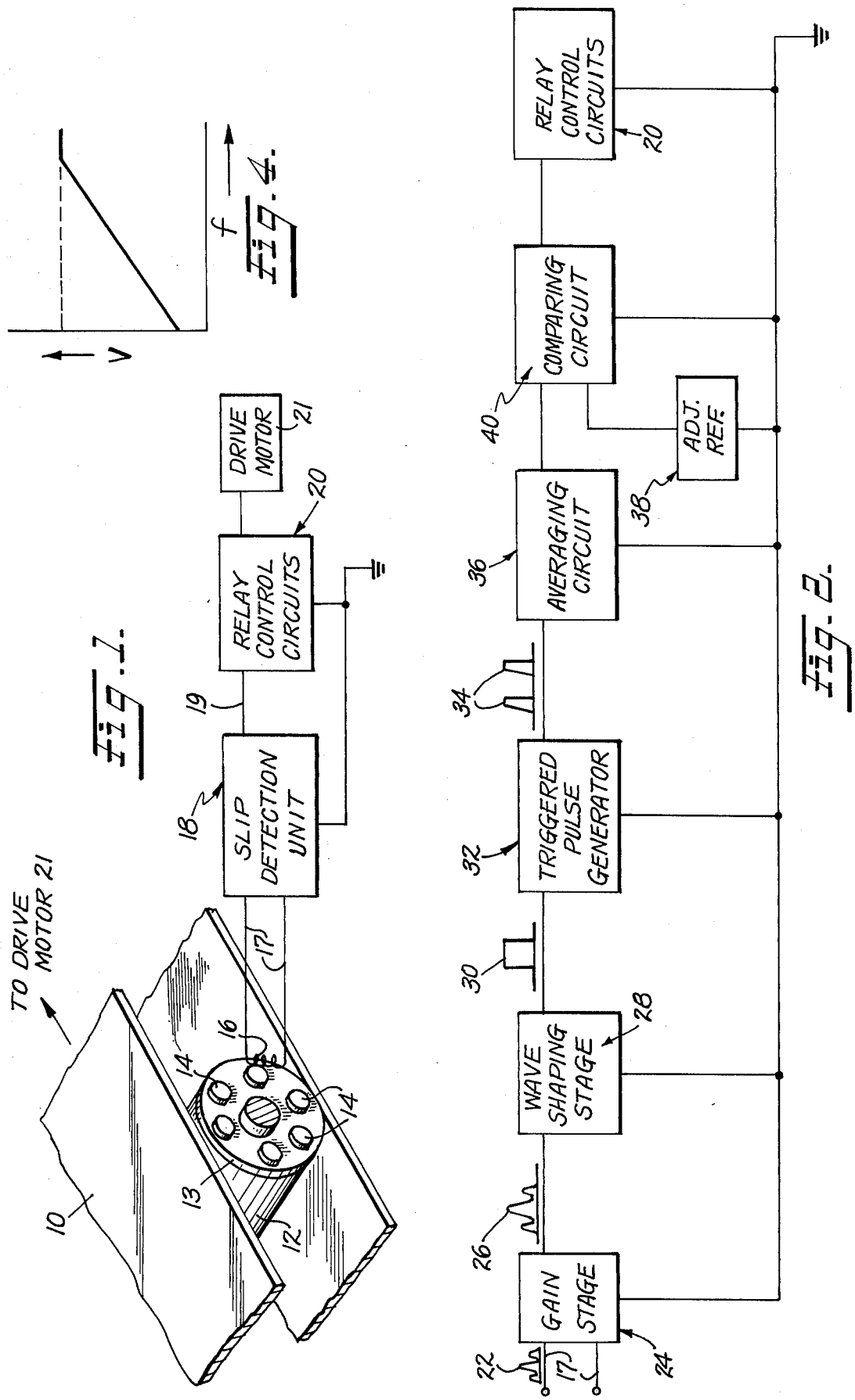

ELECTRONIC SLIP DETECTOR CIRCUIT

BACKGOUND OF THE INVENTION

1. Field of the Invention

The invention relates to slip-responsive devices, and more specifically to devices for shutting off driving motors when the element driven thereby experiences excessive slip.

2. Description of the Prior Art

Slipping switches are used extensively in the coal mining industry and are generally required on mine conveyor belts. Centrifugally controlled mechanical switches have been used extensively but such switches have proven unreliable and are subject to wear and damage due to improper lubrication. A switch jammed in a closed position because of a mechanical failure will not disconnect a motor when belt speed drops. An electronically activated switch avoids such problems.

A prior art attempt to solve the problems associated with using mechanical switches for conveyor belt slippage detectors is illustrated by Stiebel U.S. Pat. No. 3,845,375 which teaches the generation of pulses, used to trigger a monostable multivibrator thereby producing a sequence of pulses whose frequency is proportional to the belt speed. In opeation, a capacitor is charged linearly, the voltage thereon being used to cause a unijunction transistor to fire, thereby deactivating a relay and de-energizing the motor's circuit. Stiebel, however, utilizes the interruption of a light beam to generate the pulse, and relies upon many discrete electirc components which results in a rather complex circuit design.

Other prior art references of interest include Kada et al. U.S. Pat. No. 3,877,004 and Hinz U.S. Pat. No. 3,130,393. Neither of these teachings provide for automatic cut-off of the drive motor upon detection of slippage.

SUMMARY OF THE INVENTION

The instant invention provides a slip-detection apparatus, overcoming the deficiencies of the prior art, by using a simple transducer — pick-up combination, and comprising high-gain operational amplifiers to disconnect a driving motor in a material conveying system responsive to conditions of excessive slippage.

It is thus a primary object of the invention to provide an accurate slip-detection and control device.

An additional object of the invention is to provide a slip-detection apparatus utilizing a novel magnetic transducer, radily manufactured and assembled, without providing any mechanical imbalance to the system being monitored. It is a further object of the invention to provide a slip-detection apparatus utilizing highly reliable operational amplifiers in a circuit requiring few components. Yet another object of the invention is to provide a slip-detection apparatus having a variable threshold slip for use in different environments for variable permissible slip levels.

The device of the invention overcomes the disadvantages of the prior art by providing a ring, having a plurality of magnets thereon, for operation in conjunction with a belt roller and a magnetic pick-up coil, to generate pulses responsive to belt speed. The pulses are shaped and converted to provide a DC voltage level proportional to conveyor speed. When the voltage representing conveyor speed drops below in adjustabe reference, a realy is degenergized, thereby disconnecting the conveyor driving motor.

BRIEF DESCRIPTION OF THE DRAWINGS

Other objects and features of the invention will become clear from the detailed description thereof, which is intended merely to represent one embodiment of the invention and not in any way to limit the scope of the invention thereto, wherein;

FIG. 1 is an illustration of the speed-detection apparatus used in conjuncton with a belt roller;

FIG. 2 is a block diagram of the electronic portion of the apparatus shown in FIG. 1;

FIG. 4 is an illustration of the transfer function of a possible averaging circuit as used in FIG. 2.

DETAILED DESCRIPTION OF THE INVENTION

Figure 3:
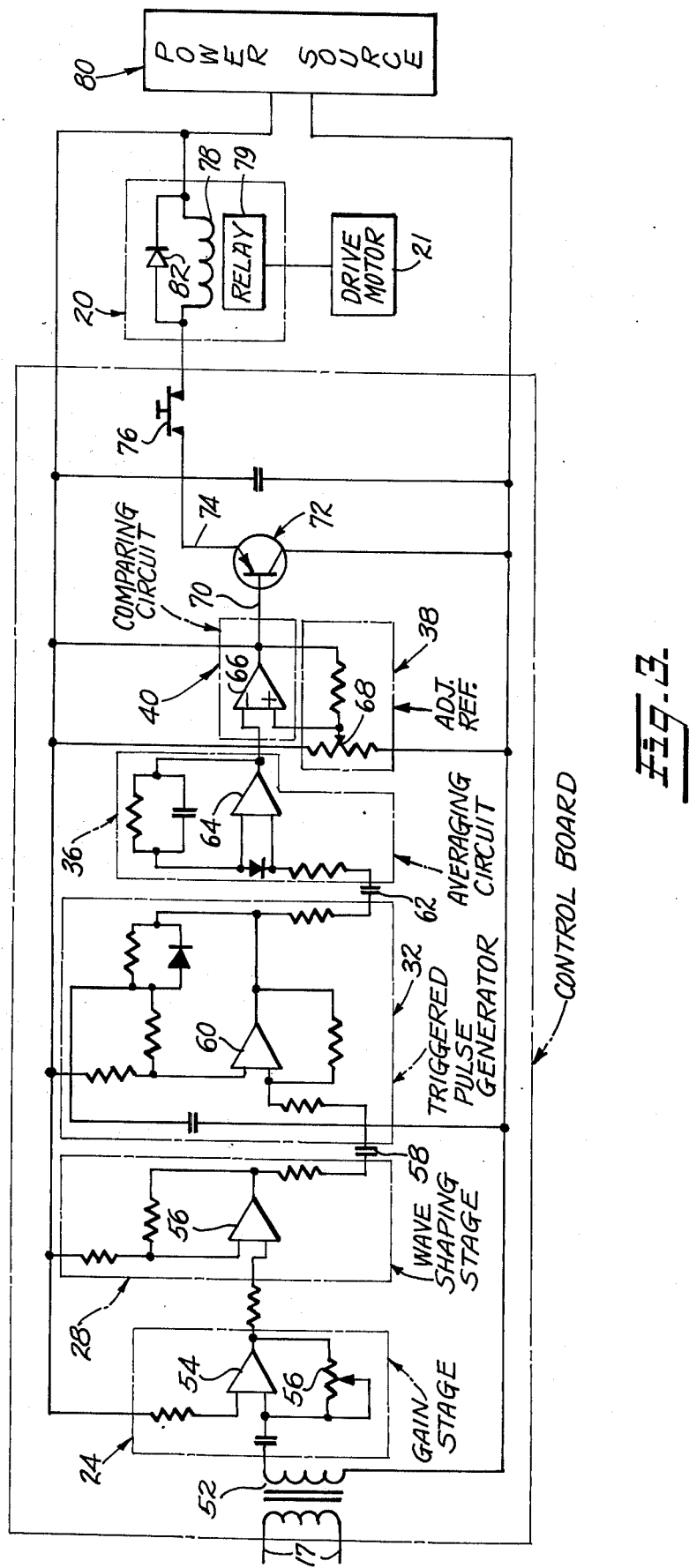
FIG. 3 is a detailed schematic diagram of the apparatus of FIG. 2.

Referring to FIG. 1, a conveyor belt 10 is shown driving a belt roller 12 having thereon a ring 13 with a plurality of magnets 14 thereon. It is within the scope of this invention that the roller be an idling roller, or an idiling pulley, or an end roller being rotated by belt 10. Ring 13 may be affixd to roller 12 by bonding, drilling a keyed pilot hole, or any other means for attaching such a ring to an edge of a rotating member. It is within the scope of the invention to have magnets 14 bonded directly to the edge of roller 12.

Coil 16 is used to detect the passage of magnets 14 thereby, producing voltage pulses on conductors 17 as a result thereof. Since it is only relative motion between the magnets and the coil which is of interest, it is conceivable that a coil may be mounted on the roller and a magnet be fixed adjacent thereto. It is further contemplated that any magnetically sensitive detecting means may be used in place of coil 16, or that other, non-magnetic speed sensing means might be employed.

The pulses generataed by magnetic detecting means 16 are conducted to slip detection unit 18, which produces and output signal on conductor 19 to relay control circuits 20, the latter controlling the flow of current to a driving motor 21 for the conveyor belt 10.

FIG. 2 illustrates in block diagram form the make-up of slip detection unit 18. The pulses produced by magnetic detecting means 16 are illustrated by a waveform 22 which is amplified by gain stage 24 to provide a waveform of sufficient voltage to be shaped by a wave-shaping stage 28.

The wave-shaping stage 28, comprising a squaring means such as a clipping circuit or a Schmidt trigger, produces a suqare pulse 30 responsive to the occurrence of pulse 26. A pulse-generating means 32 is triggered by pulse 30. Pulse 30 may have widely varying times of duration, corresponding to the speed of rotation of roller 12. Generator 32 produces a sequence of fixed-duration pulses 34, each in response to a leading edge of a pulse 30. Pulse generator 32 may comprise, for example, a monostable multivibrator, and more specifically, a non-retriggerable monostable multivibrator. Thus, taking the area under pulses 34 in a given period of time, and providing an output voltage proportional to that area, effectively yields an output voltage which is proportional to the frequency of the pulses. The process of responding to the area in a period f time is, in effect, averaging the pulse train over a period of time.

Averaging circuit 36 may have a voltage to frequency transfer function as shown in FIG. 4 where the output voltage, shown as the ordinate therein, increases linearly with the frequency of pulse train 34. The output of circuit 36 is not a ramp voltage, but a varying voltage dependent on the frequency of pulses 34.

With the assumption tht driving motor 21 operates at a constant speed, it is apparent that if the output of averaging circuit 36 drops, then belt 10 is moving at a slower speed, and thus is slipping with respect to the driving motor 21. An adjustable reference voltage source 38 produces a reference voltage which may be selected to correspond to a particular driving motor operating speed, such that the average voltage will drop below that reference voltage only when the blet slip exceeds a particular allowable value. This determination is made by comparing circuit 40, which compares the output of averaging circuit 36 with the adjustable reference voltage.

Comparing means 40 may be, for example, a comparator whose output changes form a low to a high value when the average voltage drops below the reference voltage, It is, of course, perfectly possible to reverse the connections of the reference voltage and the average voltage to tahe inputs of comparator 40, thereby achieving a low output voltage of the comparator when the average voltage drops below the reference.

The output of comparator 40 is used to drive relay control circuit 20. Control circuit 20 may be any device which causes energization or de-energization of a relay in the current supply circuit of motor 21. One such apparatus may be transistor, acting as a switch turned on and off by the output of comparator 40. Since the transistor is in series with a relay, it thereby causes the relay to be energized or de-energized in accordance with the output of comparator 40. the control circuit may, of course, be any other device which may be switched on or off, such as a silicon controlled rectifier, a unijunction transistor, a porgrammable unijunction transistor, a flip-flop, a field effect transistor or any other electronic equivalent of a switch.

FIG. 3 shows a detailed schematic diagram of the block diagram of FIG. 2. Specifically, a transformer 52 is used to couple the signal generated by magnetic detector means 16 to gain stage 24. The gain is provided by operational amplifier 54, having a feedback resistor 56 used for gain adjustment. The output of gain stage 24 is provided as input to wave shaping stage 28, shown as a Schmidt trigger comprising a high-gain amplifier 56 which drives the input to clipping, thereby squaring any input waveform. The output of shaping stage 28 is coupled by capacitor 58 to triggered pulse generator 32, comprising operational amplifier 60 used in a non-retriggerable monostable multivibrator configuration.

The output of generator 32 is coupled by capacitor 62 to the input of averaging circuit 36, utilizing operational amplifier 64 in an integrator circuit as shown. The output of averaging circuit 36 is provided as one input to comparator 66 in the comparing circuit 40. The other input to comprator 66 is provided by adjustable reference source 38, shown as potentiometer 68.

The output of comparator 66 is used to drive base 70 of transistor 72. For illustrative purposes only, transistor 72 is shown as a PNP transistor, having its emitter 74 connected through a manually operable pushbutton switch 76 to operating coil 78, the latter energizing a relay 79 when current passes therethrough. The relay 79 is connected to turn on or off driving motor 21. The other terminal of operating coil 78 is connected to power supply 80 which also supplies power to all the other circuits used in the detection unit.

It is completely within the scope of the invention to use an NPN transistor instead of the PNP transistor as shown. The only required modifications would be to connect the ouptut of averaging circuit 36 to the positive input terminal of comparator 66, and the reference voltage to the negative input thereof, as previously described. Additionally, the emitter would be connected to ground terminal 81, while the collector of the NPN transistor would be connected to switch 76.

In operation, the input pulses on conductors 17 are coupled to gain stage 24 by transformer 52. Stage 24 provides sufficient gain to the pulses for activation of Schmidt trigger 28, producing square pulses as inputs to triggered ulse generator 32. The output of generator 32, a sequence of fixed width pulses, is averaged by averaging circuit 36, producing an output volatge linearly dependent on the frequncy of rotation of roller 12. When the frequency drops below a level established by reference source 38, the output of comparator 66 rises to a voltage which turns transistor 72 off. The emitter terminal 74 then rises in voltage, effectively removing ground from operating coil 78, thereby de-energizing the relay associated therewith. De-energization of the relay interrupts the flow of current to motor 21, thereby turning off the driving motor for conveyor belt 10 in the situation of excessive slippage.

It is noted that switch 76 is provided for manual shut-off of the motor in case of circuit malfunction.

Diode 82 is provided to permit the current in operating coil 78 to decay without burning out transistor 72 due to the high voltage that would be generated by an abrupt turnoff of the current in the coil.

Having thus described the objects, operation and advantages of the embodiment of the invention, it will be obvious to those skilled in the art that various modifications and changes may be made thereto. The scope of the invetion as defined by the appended claims is not limited to the above described embodiment and includes the modifications thereof.

I claim:

1. In a conveyor belt driving apparatus, a slip responsive motor disconnecting system comprising:
    a. means for detecting belt speed and for providing signals corresponding thereto;
    b. amplifying means connected to said detecting means for amplifying said signals and for providing amplified signals;
    c. waveform shaping means connected to said amplifying means for receiving said amplified signals and for providing a fixed shape to said amplified signals;
    d. pulse generating means responsive to said waveform shaping means for producing a pulse responsive to an output of said waveform shaping means;
    e. a frequency to voltage conversion means, connected to said pulse generating means and responsive to the pusles produced thereby, for producing an output voltage level dependent on a frequency of repetition of sad pulses;
    f. adjustable reference voltage means for providing an adjustable reference voltage;
    g. comparing means connected to said conversion means and said adjustable reference voltage means for comparing said output voltage level with said adjustable reference voltage, and for producing a first voltage when said reference voltage is greater than said output voltage level, and for producing a second voltage when said refrence voltage is not greater than said output voltage level;

h. switching means connected to said comparing means for receiving the 1st and 2nd voltages of said comparing means for switching from a first state to a second state when said comparing means output voltage changes form said first voltage to said second voltage, and for switching form said second state to said first state when said comparing means output voltage changes from said second vlotage to said first voltage;

i. conveyor belt driving means responsive to said switching means for driving said conveyor belt only when said switching means is in said first state;

whereby said conveyor belt driving means ceases to drive said conveyor belt when a relationship exists between said reference voltage and said output voltage of said frequecny to voltage conversion means indicative of said conveyor belt moving at a speed lower than some predetermined value, so that said conveyor belt driving means is de-energized when said conveyor belt slip exceeds a predetermined threshold.

2. A slip responsive system as recited in claim 1 wherein:
a. said belt speed detecting means comprises a rotary element driven by said conveyor belt, said rotary element having at least one magnetic element thereon;
b. said sdetecting means further comprises a magnetically sensitive apparatus responsive to relative motion between said magnetically responsive apparatus and said magnetic element, said magnetically responsive apparatus producing a voltage in response to said relative motion;
c. said switching means comprises a transistor;
d. said switching means further comprises a relay means in circuit with said transistor; and
e. said conveyor belt driving means comprises a motor, said motor being switched on and off by said relay means.

3. A slip responsive system as recited in cliam 2 wherein said rotary element comprises an idler roller having a ring attached to the circumference thereof, said ring having a plurality of magnets attached thereto.

4. A slip responsive system as recited in claim 2 wherein:
a. said waveform shaping means comprises a Schmidt tirgger;
b. said frequency to voltage conversion means comprises an averaging circuit.

5. A slip responsive system as recited in claim 4 wherein:
a. said averaging circuit comprises an integrator; and
b. said pulse generating means comprises a nonretriggerable monostable multivibrator.

6. A slip responsive system as recited in claim 2, wherein:
a. said waveform shaping means comprises a pulse squaring circuit;
b. said frequency to voltage conversion means comprises and intergrator for averaging said pulses; and
c. said pulse generating means comprises a nonretriggerable monostable multivibrator.

7. A slip responsive system as recited in claim 6, wherein:
a. said amplifying means comprises a variable gain connected operational amplifier;
b. said squaring circuit comprises an over-driven operational amplifier;
c. said monostable multivibrator comprises an operational amplifier;
d. said integrator comprises an operational amplifier.

8. A slip responsive system as recited in claim 5, wherein:
a. said amplifying mean comprises a variable gain connected operational amplifier;
b. said squaring cirucit comprises an over-driven operational amplifier;
c. said monostable multivibrator comprises an operational amplifier;
d. said integrator comprises an operational amplifier.

9. A safety apparatus for use in coal mines comprising:
a. conveyor belt;
b. a motor for driving said conveyor belt;
c. a belt roller driven by said conveyor belt;
d. a ring mounted on said belt roller;
e. a magnet mounted on said ring;
f. a detecting means for producing a voltage pulse responsive to movement of said magnet past said detecting means;
g. an amplifying means for amplifying said voltage pulse to a level usable by a waveform shaping means;
h. a waveform shaping means for providing square edges to said amplified voltage pulse;
i. a pulse generating means for producing fixed duration pulses responsive to a square edge of said shaped, amplified voltage pulse;
j. averaging means for providing an output voltage having a magnitude dependent on an average value of said fixed duration pulses;
k. adjustable reference voltage generating means;
l. comparing means for comparing said ouput voltage of said averaging means with said adjustable reference voltage, said comparing means producing a first voltage if said output voltage is lower than said reference voltage, and a second voltage if said output voltage is not lower than said reference voltage;
m. a controlling means responsive to the voltage produced by said comparing means for controlling a relay to be energized when one of said first and second output voltages is produced by said comparing means, and for controlling said relay to be de-engerized when another of said first and second output voltages is produced by said comparing means; and
n. a relay for controlling flow of current to said motor; whereby a series of fixed duration pulses are produced by said pulse generating means, said series of pulses having a frequency proportional to a velocity of said conveyor belt, and whereby an output voltage is produced by said averaging means which is dependent on said conveyor belt velocity; said averaging means output voltage being compared with a reference voltage to determine when said velocity drops below a reference threshold, thereby indicating an excessive slippage of said conveyor belt, and thereby shutting off said motor by disconnecting the flow of current thereto.

10. A safety apparatus for use in coal mines as recited in claim 9 wherein:
 a. said ring has a pluratliy of magnets mounted thereon;
 b. said detecting means comprises a coil;
 c. said amplifying means comprises an operational amplifier;
 d. said waveform shaping means comprises a Schmidt tirgger, said Schmidt trigger further comprising a high-gain amplifier being drive to a clipping operation;
 e. said pulse generating means comprises a non-retriggerable monostable multivibrator being triggered by a positive going signal produced by said Schmidt trigger;
 f. said averaging means comprises an integrator, said integrator further comprising an operational amplifier; and
 g. said controlling means comprises a transistor.

11. A saftey apparatus for use in coal mines a recited in claim 10, wherein:
 a. said coil detecting means is transformer-coupled to said amplifying means;
 b. said Schmidt trigger is capacitively coupled to said non-retriggerable monostable multivibrator;
 c. said non-retriggerable monostable multivibrator is capacitively coupled to said integrating operational amplifier;
 d. said adjustable reference voltage generating means comprises a potentiometer;
 e. said first voltage produced by said comparing means is greater than said second voltage porduced by said comparing means;
 f. said transistor comprises a PNP transistor having an emitter;
 g. said emitter has a manually activated switching means in series therewith for manually turning off said motor; and
 h. said emitter further has a controlling coil of said relay in series therewith.

12. A safety apparatus for use in coal mines as recited in claim 10, wherein:
 a. said coil detecting means is transformer-coupled to said amplifying means;
 b. said Schmidt trigger is capacitively coupled to said non-retriggerable monostable multivibrator;
 c. said non-retriggerable monostable multivibrator is capacitively coupled to said integrating operational amplifier;
 d. said adjustable reference voltage generating means comprises a potentiometer;
 e. said first voltage produced by said comparing means is less than said second voltage produced by said comparing means;
 f. said transistor comprises an NPN transistor having a collector;
 g. said collector has a manually-activated switching means in series therewith for manually turning off said motor; and
 said collector further has a controlling coil of said relay in series therewith.

* * * * *